United States Patent Office 2,705,689
Patented Apr. 5, 1955

2,705,689

METHOD OF MODIFYING THE SURFACE OF UNSATURATED CELLULOSE ESTER CONTAINING BODIES

William B. Hewson, Wilmington, Del., assignor to Hercules Powder Company, Wilmington, Del., a corporation of Delaware No Drawing. Application October 31, 1952,
Serial No. 318,109

11 Claims. (Cl. 117—62)

This invention relates to cellulose esters and more particularly to unsaturated cellulose esters and to improvements in the properties thereof.

Cellulose esters such as cellulose acetate have a number of shortcomings which detract from their usefulness in textiles and films. Among these shortcomings are: solubility in organic solvents, especially those of the type used for dry cleaning, low softening point, poor dye susceptibility, and gas fading of dyed fabrics. It is known to improve cellulose esters with respect to softening point and solubility by introducing an unsaturated acyl radical and subjecting the ester to cross-linking. However, this procedure does not improve dye susceptibility when the known methods of cross-linking are used in the process.

Now in accordance with the present invention, it has been found that all of these shortcomings are overcome and in addition greatly improved dyeing properties are achieved by reacting a cellulose ester having an unsaturated acyl D. S. in the range of about 0.01 to about 1.5 with a permanganate salt.

The reaction with a permanganate salt not only effects a form of cross-linking but, in contrast to known cross-linking agents, also brings about a very distinct improvement in dyeing properties. In carrying out the process of this invention, manganese dioxide is deposited on and possibly also combined with the surfaces contacted by the permanganate to give them a dark color. The manganese dioxide may be subsequently chemically removed to provide a bleached surface suitable for dyeing, while most of the properties of the dark material are retained.

The following examples illustrate the method of the present invention and the improvement resulting therefrom.

Example 1

Acetone-soluble cellulose acetate sorbate (sorboyl D. S. 0.06, acetyl D. S. 2.39) in the form of a 3 mil film was immersed in a 50% aqueous acetone solution containing 0.5% potassium permanganate for 5.0 minuted at 25° C. The resultant dark reddish-brown film showed only 9% solubility when immersed in acetone for 3.0 hours at 25° C. However, the material dissolved very slowly in 9:1 methylene chloride ethanol or glacial acetic acid.

Example 2

Cellulose acetate sorbate (sorboyl D. S. 0.06, acetyl D. S. 2.39) in the form of 150 denier yarn was knit into a fabric. Samples of the fabric were immersed in aqueous solutions of potassium permanganate of various concentrations from 0.5 to 1.0% strength for 2–5 minutes at 25° C. and then bleached by soaking for 5 minutes at 70° C. in 5% sodium bisulfite solution. The sample treated for 5 minutes with 0.5% potassium permanganate showed 18% solubility in acetone when immersed in dry acetone for 3 hours at room temperature. The sample treated with 1% permanganate solution for 2 minutes showed 24% solubility and that treated with 1% permanganate solution for 4 minutes showed 28% solubility in acetone. The fabrics were also insoluble in dry cleaning solvents such as carbon tetrachloride, trichloroethylene, and Stoddard solvent. However, the samples dissolved very slowly in 9:1 methylene chloride ethanol or glacial acetic acid. These samples were readily ironed with an ordinary pressing iron at a temperature in the range which would cause immediate sticking to the untreated cellulose acetate sorbate. These samples were further divided and strips were dyed with pontacyl wool blue BL (Color Index 833) with fast wool yellow 3GL (Color Index 636) and with orange No. 2 (Color Index 151). In each instance the treated cellulose acetate sorbate dyed a darker shade of color than a corresponding sample of untreated cellulose acetate sorbate or cellulose acetate similarly treated. The fabric dyed with pontacyl wool blue BL was not altered in color after exposure for 19 hours in an atmosphere of 1000 p. p. m. nitrogen dioxide. A cellulose acetate fabric dyed with an acetate blue dye resistant to gas fading (eastone blue BGF) became very reddish in color after only 1.0 hour's exposure in the same atmosphere.

Example 3

The 3 mil films of esters listed in the tabulation below were treated with 0.5% aqueous potassium permanganate solution at 25° C. for the times indicated and then bleached for 5.0 minutes in 5% sodium bisulfite solution at 60–70° C. The results show that each of these unsaturated esters is rendered more receptive to wool-type dyes by this treatment.

| Cellulose Ester | Treatment Time (Min.) | Depth of Color |
|---|---|---|
| Acetate (2.39 D. S.) Sorbate (0.06 D. S.) | 10 | Light. |
| Do | 0 | None. |
| Acetate (2.98 D. S.) Vinyl Acrylate (0.02 D. S.) | 10 | Very light. |
| Do | 0 | None. |
| Acetate (2.6 D. S.) Crotonate (0.4 D. S.) | 30 | Light. |
| Do | 0 | None. |
| Acetate (2.67 D. S.) o-Dihydrotoluate (0.065 D. S.) | 10 | Light. |
| Do | 0 | None. |
| Acetate (2.5 D. S.) | 10 | Do. |

Example 4

A 150 denier yarn of cellulose acetate sorbate (sorboyl D. S. 0.06, acetyl D. S. 2.39) was woven into a fabric and samples were treated for varying lengths of time with 0.5% aqueous potassium permanganate at 25° C. followed by a 1-minute bleach in 5% sodium bisulfite solution at 50–60° C.

A sample treated for 5 seconds with the permanganate solution dyed dark blue using pontacyl wool blue BL (0.15 g./100 ml. water) as compared to a very very light blue for an untreated sample. A sample treated for 10 seconds with the permanganate solution dyed a very dark blue. Samples treated for longer periods of time up to 3 minutes dyes only slightly darker than the sample treated for 10 seconds with the permanganate solution.

Example 5

The effect of D. S. of unsaturated acid group on dye receptivity was determined by treating 150 denier cellulose acetate sorbate yarn of 0.04, 0.06, and 0.08 sorboyl D. S. (acetyl D. S. 2.39–2.48) with 0.5% aqueous potassium permanganate at 29–30° C. for 4 minutes and then bleaching at 70° C. for 5 minutes in 5% sodium bisulfite solution. To test dye receptivity these yarns were each dyed in an aqueous dye bath of pontacyl wool blue BL (0.5 g./100 ml. water) for 5 minutes along with untreated samples of the same yarn. The treated samples all dyed a deep blue and the untreated samples a pale washed out blue.

Three mil films having sorboyl D. S.'s of 0.02 and 0.06 were similarly treated. The untreated samples showed no detectable color pickup while the treated films dyed a light blue.

Unsaturated cellulose esters useful for the process of this invention include esters of unsaturated dienoic acids such as the vinyl acrylate, o-dihydrotoluate and the sorbate as well as simple unsaturated esters such as the crotonate, acrylate, methacrylate, and cinnamate. The unsaturated acids may comprise the sole ester-forming substituents but mixed esters are most desirable where saturated acyl groups from aliphatic acids form the largest percentage of the ester substituents. The D. S. of the esters used in this invention is preferably such that the ester is solvent soluble. The D. S. of the unsaturated acyl group should be in the range of 0.01 to about 1.5. The best results have been found with respect to dye receptivity after treatment of those esters having a D. S. of unsaturated acyl groups in the range of 0.02 to 0.5. In the case of the conjugated diene-type esters, the best results with respect to solvent resistances have been obtained with those having an unsaturated acyl D. S. of 0.02 to 1.0. Improved dye receptivity is found in cellulose acetate sorbate at as low sorboyl D. S. as 0.01, but reduced solubility does not appear much below about 0.02 sorboyl D. S.

The process of this invention appears to be applicable to any ester of cellulose having unsaturated acid substituents. The mechanism of the reaction or the chemical change that is effected by the reaction whereby the improved results are attained is not known. The oxidation reaction may increase both acidic groups and hydroxyl groups in the cellulose ester but acidic groups and hydroxyl groups introduced by esterification with dicarboxylic acids or hydroxy acids do not give products having similar dye receptivity. The insolubilization phenomenon has not been completely explained but it is conceivable that divalent manganese ion linkages may form a cross-linking bond through acid groups on adjacent cellulose ester molecules.

In place of potassium permanganate, other permanganate salts which can be used are the sodium, calcium, zinc, and other salts having adequate solubility.

The permanganate treatment can be carried out in water or in aqueous solutions of organic solvents which do not react rapidly with permanganate. Aqueous acetone or aqueous isopropyl alcohol solutions are satisfactory.

The concentration of permanganate in the treatment solution for effecting satisfactory results can vary from 0.01% to saturated solutions. The preferred range is 0.5 to 2.0%.

The temperature for the process of treating with the permanganate salt is preferably any temperature in the range from 0° C. to 100° C. If high concentrations of permanganate are used, the degree of reaction may be controlled by reducing the time of reaction. A temperature should be selected that does not cause softening and resulting distortion of the shaped article and also does not degrade or decompose the product.

The extent of reaction necessary to produce the desired results of this process can be determined by the depth of color due to the manganese dioxide formed in the shaped article. The time of reaction does not appear to be critical.

The shaped article containing the manganese dioxide can be bleached to provide a dye-receptive surface by treating with any reducing type of bleaching agent that will react with manganese dioxide. Thus solutions of the following are operable: sulfurous acid and salts of sulfurous acid, such as sodium sulfite, sodium bisulfite, sodium metabisulfite; sodium hyposulfite, sodium formaldehyde sulfoxylate, sodium thiosulfate, formic acid, and oxalic acid. The bleaching solution should be slightly acid reacting.

The bleaching temperature is preferably within the range of 20° C. to 100° C. and should be low enough to effect reaction and not so high as to soften the shaped article.

After the bleach the resulting product is washed free of salts by a water wash.

The improved dye receptivity developed by this invention is particularly suited to filaments and yarns. The process is also advantageous when applied to other shaped articles such as films and molded articles where a solvent resistant surface is particularly desirable. Filaments treated in the process of this invention find use also in paint brush bristles where the insolubility is advantageous, and in such a use they need not be bleached to remove the manganese dioxide.

The improved character of the unsaturated cellulose esters treated in accordance with this invention is a surface phenomenon. For example, a cellulose acetate sorbate film after treatment with a permanganate solution can be soaked in acetone. The film swells but the insolubilized surface holds it intact and it may be dried by evaporating the acetone to produce a film of about the same dimensions as before. However, if the edges are trimmed off the film, the untreated subsurface gradually dissolves so as to leave the upper and lower surfaces as insoluble films which may be separated. In the case of fibers, this characteristic is less striking, since the insolubilized surface comprises such a large part of the fiber volume. The difference between the surface and subsurface of a film can also be shown by trimming off the edges of a treated and bleached film and exposing to wool dye. Examination of the edges under the microscope shows that the surfaces exposed to the permanganate treatment are much darker due to greater dye receptivity than the subsurface which was not reached by the permanganate in the treating process.

The advantages of the present invention are manifold. It provides a means for modifying cellulose esters to improve their softening points and to increase their resistance to dry cleaning solvents. It makes the cellulose esters receptive to a large number of wool dyes which heretofore could not be used on cellulose acetate. Since these wool dyes are not subject to gas fading, the invention overcomes this serious disadvantage of dyed cellulose acetate fabrics. Due to the low D. S. of unsaturated acid required, the esters useful in this invention have all of the desirable properties of cellulose acetate as well, and can be handled in the same type of equipment as is used for cellulose acetate.

What I claim and desire to protect by Letters Patent is:

1. The method of improving the properties of shaped articles of organic solvent soluble unsaturated cellulose esters having an unsaturated acyl D. S. in the range of 0.01 to about 1.5 and which comprises reacting the cellulose ester with a 0.1% to saturated aqueous solution of a permanganate salt for a time sufficient to cause surface deposition of manganese dioxide.

2. The method of claim 1 where the unsaturated cellulose ester is cellulose acetate sorbate.

3. The method of claim 1 where the unsaturated cellulose ester is cellulose acetate crotonate.

4. The method of claim 1 where the unsaturated cellulose ester is cellulose acetate vinyl acrylate.

5. The method of claim 1 where the unsaturated cellulose ester is cellulose acetate acrylate.

6. The method of improving the properties of shaped bodies of organic solvent soluble unsaturated cellulose esters having an unsaturated acyl D. S. in the range of 0.01 to about 1.5 and which comprises reacting the cellulose ester with a 1.0% to saturated aqueous solution of a permanganate salt for a time sufficient to cause surface deposition of manganese dioxide and subsequently treating with a manganese dioxide dissolving reagent.

7. The method of improving the properties of shaped bodies of organic solvent soluble unsaturated cellulose esters having an unsaturated acyl D. S. in the range of 0.01 to about 1.5 and which comprises reacting the cellulose ester with a 0.1% to saturated aqueous solution of a permanganate salt for a time sufficient to cause surface deposition of manganese dioxide and subsequently treating with a reducing-type manganese dioxide dissolving reagent.

8. The method of improving the properties of shaped bodies of organic solvent soluble unsaturated cellulose esters having an unsaturated acyl D. S. in the range of 0.01 to about 1.5 and which comprises reacting the cellulose ester with a 0.1% to saturated aqueous solution of potassium permanganate for a time sufficient to cause surface deposition of manganese dioxide and subsequently with sodium bisulfite.

9. The method of improving the properties of shaped bodies of organic solvent soluble cellulose acetate sorbate having an unsaturated acyl D. S. in the range of about 0.01 to about 1.5 which comprises reacting the cellulose ester with a 0.1% to saturated aqueous solution of a permanganate salt for a time sufficient to cause surface deposition of manganese dioxide and subsequently dissolving out the deposited manganese dioxide.

10. A shaped article of an organic solvent soluble cellulose ester of an unsaturated organic acid, wherein the unsaturated acyl D. S. is in the range of about 0.01 to about 1.5, having a surface and a subsurface said surface having been treated in accordance with claim 1 and characterized by having a lower solubility in organic solvents and greater dye receptivity to wool dyes than the subsurface when exposed to dissolving and to dyeing conditions.

11. A shaped article of an organic solvent soluble cellulose ester of an unsaturated organic acid, wherein the unsaturated acyl D. S. is in the range of about 0.01 to about 1.5, having a surface and a subsurface said surface having been treated in accordance with claim 6 and characterized by being free of manganese dioxide and further characterized by having lower solubility in organic solvents and greater dye receptivity to wool dyes than the subsurface when exposed to dissolving and to dyeing conditions.

References Cited in the file of this patent

UNITED STATES PATENTS

| | | |
|---|---|---|
| 2,396,165 | Ernsberger | Mar. 5, 1946 |
| 2,609,362 | Fryling | Sept. 2, 1952 |

FOREIGN PATENTS

| | | |
|---|---|---|
| 437,271 | Great Britain | Oct. 28, 1935 |